United States Patent
Kominar et al.

(10) Patent No.: US 9,384,342 B2
(45) Date of Patent: Jul. 5, 2016

(54) METHODS AND DEVICES FOR PROVIDING WARNINGS ASSOCIATED WITH CREDENTIALS TO BE STORED IN A CREDENTIAL STORE

(71) Applicant: BLACKBERRY LIMITED, Waterloo (CA)

(72) Inventors: Jeremy L. Kominar, Waterloo (CA); Neil Patrick Adams, Waterloo (CA); Alexander Truskovsky, Waterloo (CA); Christopher Lyle Bender, Kitchener (CA); Daryl Joseph Martin, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 330 days.

(21) Appl. No.: 13/891,627

(22) Filed: May 10, 2013

(65) Prior Publication Data
US 2014/0337941 A1 Nov. 13, 2014

(51) Int. Cl.
G06F 21/00 (2013.01)
G06F 21/45 (2013.01)

(52) U.S. Cl.
CPC .................................. G06F 21/45 (2013.01)

(58) Field of Classification Search
CPC ...................................................... G06F 21/45
USPC ...................................................... 726/6, 25
See application file for complete search history.

(56) References Cited

U.S. PATENT DOCUMENTS

| 6,208,339 | B1 | 3/2001 | Atlas et al. |
| 7,136,490 | B2 | 11/2006 | Martinez et al. |
| 7,490,242 | B2 | 2/2009 | Torres et al. |
| 7,552,467 | B2 | 6/2009 | Lindsay |
| 7,818,809 | B1 * | 10/2010 | Sobel et al. ..................... 726/26 |
| 8,065,724 | B2 | 11/2011 | Waltenberg et al. |

(Continued)

FOREIGN PATENT DOCUMENTS

| EP | 1315065 | 5/2003 |
| EP | 1918844 | 5/2008 |

OTHER PUBLICATIONS

ManageEngine, "Password Alerts, Notifications & SIEM Integration", Zoho Corporation Pvt. Ltd., <http://www.manageengine.com/products/passwordmanagerpro/password-notifications.html>, retrieved Mar. 25, 2013.

(Continued)

*Primary Examiner* — John B King
(74) *Attorney, Agent, or Firm* — Integral IP; Miriam Paton; Amy Scouten

(57) ABSTRACT

Methods and devices for providing a warning associated with credentials to be stored in a credential store on a computing device are disclosed herein. In one broad aspect, the method comprises receiving a request to store, in the credential store, at least one credential for a specified service, determining whether a secure connection between the computing device and the specified service is available, associating the specified service with a level of security based on at least one of an availability of the secure connection or one or more properties of the secure connection, and providing a warning in response to determining that at least one credential stored in the credential store corresponds to the at least one credential for the specified service and is for a service that is associated with a level of security different from the level of security with which the specified service is associated.

25 Claims, 10 Drawing Sheets

(56) References Cited

U.S. PATENT DOCUMENTS

| | | | |
|---|---|---|---|
| 8,108,685 | B2 | 1/2012 | Hurley |
| 8,156,342 | B2 | 4/2012 | Roth et al. |
| 8,200,582 | B1 | 6/2012 | Zhu |
| 8,230,231 | B2 | 7/2012 | Freeman et al. |
| 8,281,372 | B1 | 10/2012 | Vidal |
| 8,286,000 | B2 | 10/2012 | Vedula et al. |
| 8,291,470 | B2 | 10/2012 | Delia et al. |
| 8,321,437 | B2 | 11/2012 | Lim |
| 2005/0203881 | A1 | 9/2005 | Sakamoto et al. |
| 2006/0242109 | A1 | 10/2006 | Pereira et al. |
| 2007/0005975 | A1 | 1/2007 | Bauchot et al. |
| 2007/0039042 | A1* | 2/2007 | Apelbaum ............ 726/6 |
| 2008/0320588 | A1 | 12/2008 | Lipetz |
| 2009/0150677 | A1 | 6/2009 | Vedula et al. |
| 2009/0165102 | A1 | 6/2009 | Zagni |
| 2009/0216795 | A1 | 8/2009 | Cohen et al. |
| 2010/0132043 | A1 | 5/2010 | Bjorn et al. |
| 2010/0293605 | A1 | 11/2010 | Longobardi |
| 2012/0110668 | A1 | 5/2012 | Schechter et al. |
| 2013/0014236 | A1 | 1/2013 | Bingell et al. |

OTHER PUBLICATIONS

Apple Inc., "Keychain Services Programming Guide", Apple Inc., dated Jun. 11, 2012.

Felgall, "Password Strength" <http://www.felgall.com/passstrength.htm>, retrieved May 6, 2013.

Extended European Search Report. European Patent Application No. 13167376.6. Dated: Oct. 14, 2013.

Anonymous, "LastPass Now Warns You When You're Using a Weak or Duplicate Password", LastPass, Mar. 25, 2013, XP002713289. Retrieved from the Internet: URL:http://blog.lastpass.com/2013/03/lastpass-now-warns-you-when-youre-using.html [retrieved on Sep. 11, 2013].

Anonymous, "New Year's Resolutions with LastPass: #3 Replace Weak and Duplicate Passwords", LastPass, Jan. 9, 2012, XP002713290. Retrieved from the Internet: URL:http://blog.lastpass.com/2012/01/new-years-resolutions-with-lastpass-3.html [retrieved on Sep. 20, 2013].

Anonymous, "Stop Using the Same Key for Every Lock!", LastPass, Jul. 16, 2012, XP002713291. Retrieved from the Internet: URL:http://blog.lastpass.com/2012/07/stop-using-same-key-for-every-lock.html [retrieved on Sep. 20, 2013].

Anonymous, "Increase the Security of Your LastPass Account with Two New Options", LastPass, Aug. 1, 2012, XP002713292. Retrieved from the Internet: URL:http://blog.lastpass.com/2012/08/increase-security-of-your-lastpass.html [retrieved on Sep. 20, 2013].

Anonymous, "The LastPass Autofill Menu in Chrome Gets a New Look!", LastPass, Sep. 28, 2012, XP002713293. Retrieved from the Internet: URL:http://blog.lastpass.com/2012/09/the-lastpass-autofill-menu-in-chrome.html [retrieved on Sep. 20, 2013].

Lee, Notice of Allowance for U.S. Appl. No. 13/891,258, Mar. 4, 2015.

Subashini, et al., "A survey on security issues in service delivery models of cloud computing"; Journal of Network and Computer Applications (2011), 11.

* cited by examiner

METHODS AND DEVICES FOR PROVIDING WARNINGS ASSOCIATED WITH CREDENTIALS TO BE STORED IN A CREDENTIAL STORE

FIELD

Embodiments described herein relate generally to managing credentials (e.g. passwords) stored by applications on a computing device.

BACKGROUND

A device may access a variety of different websites through a web browser. Some of these websites may control access to services and data by requiring users to set up an account and to complete a login process, which typically involves supplying an appropriate username and password. These websites may include social media sites, e-mail or other messaging services sites, photo sharing sites, online shopping sites, banking sites, sites that provide access to corporate or other data servers, and so on.

Some applications, including web browser applications for example, will allow login data such as usernames and passwords to be saved on users' computing devices. This may enhance user convenience as users need not memorize or manually enter login data for different accounts. Users may choose to configure their applications to retrieve stored login data and populate corresponding input fields automatically when the user is prompted for this data (e.g. in a web browser).

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
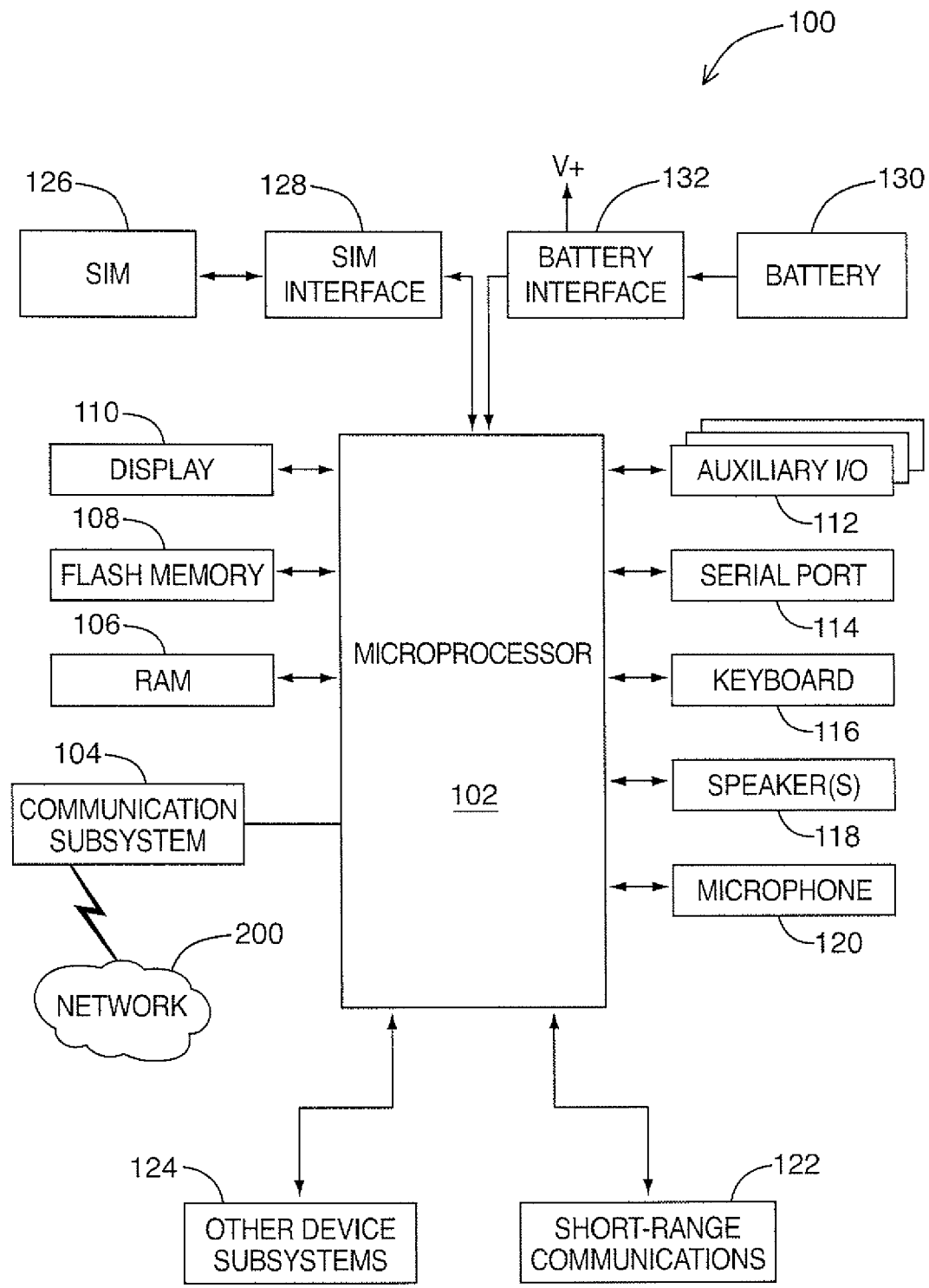
FIG. 1 is a block diagram of a mobile device in one example implementation.

To enhance security for stored login data on a computing device, a keyring application or service may be employed. A keyring may also be referred to as a keychain, a wallet, a password store or password manager, or more generally, a credential store or credential manager. A keyring may allow for the secure storage of data such as usernames, passwords, cryptographic (e.g. encryption) keys, access codes, digital certificates, and other secure data items, for multiple applications and services, typically by storing the data in encrypted form. In some keyring implementations, a user may need to enter a separate password that has been specifically assigned to the keyring in order to unlock the keyring (i.e. allow access to data stored by the keyring).

While the keyring is unlocked, certain applications (e.g. potentially restricted to those applications considered trustworthy by the user) may be permitted access to data stored by the keyring. Accordingly, a user need not login separately to services for which passwords are stored in an unlocked keyring, since any application that is permitted access to the corresponding login data in the unlocked keyring may automatically retrieve that login data to authenticate the user for those services.

When selecting a username and password combination to be associated with an account for a given service, users are often encouraged to avoid using simple passwords that can be easily guessed by an attacker. Certain services may prevent users from choosing a password that is not sufficiently complex. Password complexity rules may be enforced during the setup of an account, requiring users to choose a password for the account that, for example, is of a minimum character length, begins or does not begin with certain characters, ends or does not end with certain characters, contains a minimum number of each of one or more character types (e.g. alphabetic, numeric, symbolic), etc. By selecting a sufficiently complex password to be associated with the account, protection for the account may be enhanced as it makes it difficult for an attacker to guess the password using brute-force methods.

Although account security may be enhanced by enforcing these password complexity rules when selecting a password for a given account, the selected password can be difficult for the user to remember. Accordingly, some users may be inclined to reuse passwords for multiple accounts so that they need only memorize a small number of passwords.

Various services can be accessed over the Internet or other network. Some services are configured to permit user access over a secured connection (e.g. a Secure Sockets Layer (SSL) connection or Transport Layer Security (TLS) connection), while other services may permit user access over a connection that is not secured (e.g. not encrypted). For example, when a device visits a website where a secure communication protocol is used to protect communications between a user's computing device and a website's associated web server, the web address displayed in the user's web browser may display an "https://" prefix. Some other indicator may also be displayed within the browser interface (e.g. a locked padlock icon, a "LOCK" text indicator, etc.). Different levels of security (e.g. 128-bit encryption, 256-bit encryption, etc.) may also be applied with respect to different secured connections.

Not all computing device users are savvy enough to appreciate that if their account on a less secure site is compromised (e.g. a password used to access the less secure site is stolen), the information that an attacker might gain could be used in a subsequent attack against more secure services. For example, if the password that a user has selected for a service that does not require a secure connection to be established for user access (e.g. there may be little personal data associated with the user account considered necessary to secure) is stolen, the password could then be used by an attacker to access the account of the user for a highly secure service (e.g. an online banking service) without authorization, if the user happened to select the same password for both services.

While user convenience may be enhanced by selecting matching credentials (e.g. passwords) for different accounts and different services, there are potential security risks. On the other hand, requiring users to select different credentials for every different account may be unduly cumbersome and inconvenient.

At least some embodiments described herein generally relate to methods of providing warnings to users when credentials (e.g. passwords) are to be stored in a credential store on a computing device. For example, when a user attempts to save a credential for a non-secure site or service in the credential store, and a corresponding credential for a secure site or service is already stored in the credential store, a warning may be provided to the user that selecting the credential for use with the non-secure site or service may put data associated with the secure site or service at risk. A similar warning may be provided when the user attempts to store a credential for a secure site or service in the credential store, where a corresponding credential for a non-secure site or service is already stored in the credential store.

Accordingly, in at least some embodiments, while the use of matching credentials is not prevented, the user is notified when credentials have been selected that might be used for different sites or services associated with different levels of security. This allows the user to take action (e.g. select different passwords for the more secure services) in order to minimize the risk of compromise to secured data.

In one broad aspect, there is provided a method of providing a warning associated with credentials to be stored in a credential store on a computing device, the method comprising: receiving a request to store, in the credential store, at least one credential for a specified service; determining whether a secure connection between the computing device and the specified service is available; associating the specified service with a level of security based on at least one of an availability of the secure connection or one or more properties of the secure connection; and providing a warning in response to determining that at least one credential stored in the credential store corresponds to the at least one credential for the specified service, and is for a service that is associated with a level of security different from the level of security with which the specified service is associated.

In some embodiments, the providing comprises outputting a notification that indicates a risk of compromise to data associated with one or more secure services.

In some embodiments, the method further comprises responsive to providing the warning, prompting for user input as to whether to proceed with storing the at least one credential for the specified service in the credential store; and storing the at least one credential for the specified service in the credential store in response to receiving user input to proceed with storing.

In some embodiments, the method further comprises storing, in association with the at least one credential in the credential store, an indicator of the level of security with which the specified service is associated.

In some embodiments, the method further comprises periodically determining whether the level of security with which the specified service is associated has changed to a different level; and updating the indicator in response to determining that the level of security with which the specified service is associated has changed to the different level.

In some embodiments, the method comprises in response to the storing, disabling an auto-fill function in a user interface of the computing device when the at least one credential for the specified service is expected to be received as user input in the user interface. In some embodiments, the method comprises disabling an auto-fill function in a user interface of the computing device when any credential that is stored in the credential store and that corresponds to the at least one credential for the specified service is expected to be received as user input in the user interface.

In some embodiments, the method comprises in response to providing the warning, providing an option to cancel the request. In some embodiments, the method comprises in response to providing the warning, providing an option to prompt for at least one different credential, for the specified service, to request to store in the credential store.

In some embodiments, the specified service is associated with a secure level if the secure connection is available, and with a non-secure level if the secure connection is unavailable. In some embodiments, the specified service is associated with a secure level if the secure connection is available and is of a minimum strength, and with a non-secure level otherwise.

In some embodiments, the method further comprises polling the specified service to determine whether a secure connection between the computing device and the specified service is available. In some embodiments, the polling is performed without user intervention, in response to receiving the request.

In some embodiments, the secure connection comprises at least one of a Transport Layer Security (TLS) connection or a Secure Sockets Layer (SSL) connection.

In some embodiments, the one or more properties of the secure connection comprises at least one of: a strength of the secure connection, a key exchange algorithm type, a bulk encryption algorithm type, a server authentication algorithm type, or a message authentication code (MAC) algorithm type.

In some embodiments, the associating the specified service with the level of security is performed in accordance with a security policy governing operation of the computing device.

In some embodiments, the at least one credential stored in the credential store corresponds to the at least one credential associated with the specified service if the at least one credential stored in the credential store matches the at least one credential associated with the specified service. In some embodiments, the at least one credential stored in the credential store corresponds to the at least one credential associated with the specified service if the at least one credential stored in the credential store is determined to be sufficiently similar to the at least one credential associated with the specified service.

In some embodiments, the at least one credential for the specified service comprises a password. In some embodiments, the at least one credential for the specified service comprises a username.

In at least one broad aspect, there is provided a method, device, and computer-readable medium for providing a warning associated with credentials to be stored in a credential store on a computing device, the method comprising: receiving a request to store, in the credential store, at least one credential for a specified service; determining whether a secure connection between the computing device and the specified service is available; associating the specified service with a level of security based on at least one of an availability of the secure connection or one or more properties of the secure connection; determining a first entropy rating for the at least one credential for the specified service; for each credential stored in the credential store that is for a service associated with a same level of security as the level of security with which the specified service is associated, determining a second entropy rating for the credential; determining a relative entropy rating for the at least one credential for the specified service, the relative entropy rating comprising a function of the first and second entropy ratings; and outputting the relative entropy rating.

In some embodiments, the relative entropy rating is output in the form of at least one of a graphical icon, a numerical value, or a text descriptor.

In some embodiments, the method further comprises: responsive to outputting the relative entropy rating, prompting for user input as to whether to proceed with storing the at least one credential for the specified service in the credential store; and storing the at least one credential for the specified service in the credential store in response to receiving the user input to proceed with storing.

In some embodiments, the method comprises in response to outputting the relative entropy rating, providing an option to cancel the request. In some embodiments, the method comprises in response to outputting the relative entropy rating, providing an option to prompt for at least one different credential, for the specified service, to request to store in the credential store.

In another broad aspect, there is provided a computing device programmed to provide a warning associated with credentials to be stored in a credential store, the computing device comprising a processor configured to: receive a request to store, in the credential store, at least one credential for a specified service; determine whether a secure connection between the computing device and the specified service is available; associate the specified service with a level of security based on at least one of an availability of the secure connection or one or more properties of the secure connection; and provide a warning in response to determining that at least one credential stored in the credential store corresponds to the at least one credential for the specified service, and is for a service that is associated with a level of security different from the level of security with which the specified service is associated.

In another broad aspect, there is provided a computer-readable storage medium comprising executable instructions for programming a computing device to provide a warning prior to storing credentials in a credential store on the computing device, the instructions configuring a processor of the computing device to: receive a request to store, in the credential store, at least one credential for a specified service; determine whether a secure connection between the computing device and the specified service is available; associate the specified service with a level of security based on at least one of an availability of the secure connection or one or more properties of the secure connection; and provide a warning in response to determining that at least one credential stored in the credential store corresponds to the at least one credential for the specified service, and is for a service that is associated with a level of security different from the level of security with which the specified service is associated.

Reference is made to a mobile device in FIG. 1 for illustration purposes. At least some embodiments described herein may be more generally applicable to other electronic devices, which may or may not have voice communication capabilities. Furthermore, embodiments described herein may be generally applicable to other computing devices, including desktop computing devices, laptop computing devices, netbooks, tablet computing devices, etc.

FIG. 1 illustrates an example structure of a mobile device and how the mobile device may operate and communicates with other devices. The mobile device (sometimes referred to alternatively as a "mobile station" or a "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities).

In the example of FIG. 1, a block diagram of a mobile device is shown generally as 100. Mobile device 100 comprises a number of components, the controlling component typically being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. Other standards such as Enhanced Data GSM Environment (EDGE) and Universal Mobile Telecommunications Service (UMTS) may be employed. These standards are mentioned as examples only, and other standards may be employed on computing devices to which embodiments described herein are applied. The described embodiments are intended to use any other suitable standards that are developed in the future.

In this example implementation, the wireless link connecting communication subsystem 104 with network 200 represents one or more different Radio Frequency (RF) channels, operating according to defined protocols specified for GSM/GPRS communications. With newer network protocols, these channels are capable of supporting both circuit-switched voice communications and packet-switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), and Long Term Evolution (LTE), etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 typically also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications (e.g. illustrated as applications 400 in FIG. 2), or parts thereof, may be temporarily loaded into a volatile store such as RAM 106.

In some embodiments, mobile device 100 may send and receive communication signals over network 200 typically after network registration or activation procedures have been completed. Network access is generally associated with a subscriber or user of a mobile device 100. To identify a subscriber, mobile device 100 may require a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 would typically not be fully operational for communication with network 200.

By inserting SIM 126 into SIM interface 128, a subscriber can access subscribed services. Services could include, for example: web browsing and messaging such as e-mail, voice mail, Short Message Service (SMS), media transfers (such as music downloading or streaming), and Multimedia Messaging Services (MMS). More advanced services may include, for example: point of sale, field service and sales force automation. SIM 126 may include its own processor and memory for storing information. Once SIM 126 is inserted in SIM interface 128, it is coupled to microprocessor 102. In order to identify the subscriber, SIM 126 contains some user parameters, such as an International Mobile Subscriber Identity (IMSI) for example. An advantage of using SIM 126 is that subscribers are not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all. By way of further examples, a Universal Integrated Circuit Card (UICC), eUICC (Embedded UICC), Removable User Identify Module (R-UIM), CDMA Subscriber Identify Module (CSIM), or Universal Subscriber Identify Module (USIM) may be employed.

Mobile device 100 includes a power pack that supplies power to electronic components and that supports portability. The power pack may be of any type, but for clarity it will be assumed that mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100. In variant implementations, the mobile device 100 may be solar-powered.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications (see e.g. applications 400 in FIG. 2) may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant, video, etc.), voice communication applications, calendar applications, address book applications, utility applications, browser application, media player (e.g. audio, video, etc.) applications, social network applications, camera applications, gaming applications, productivity applications, etc. The functionality of any number of these applications may also be integrated into or accessed via a single application. For example, messaging services, social networking services, and banking services may be accessed via one application (e.g. a browser application).

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

It should be noted that the term "download" and forms thereof, are used generally herein to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE (e.g. Wifi).

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to provide additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Figure 2:
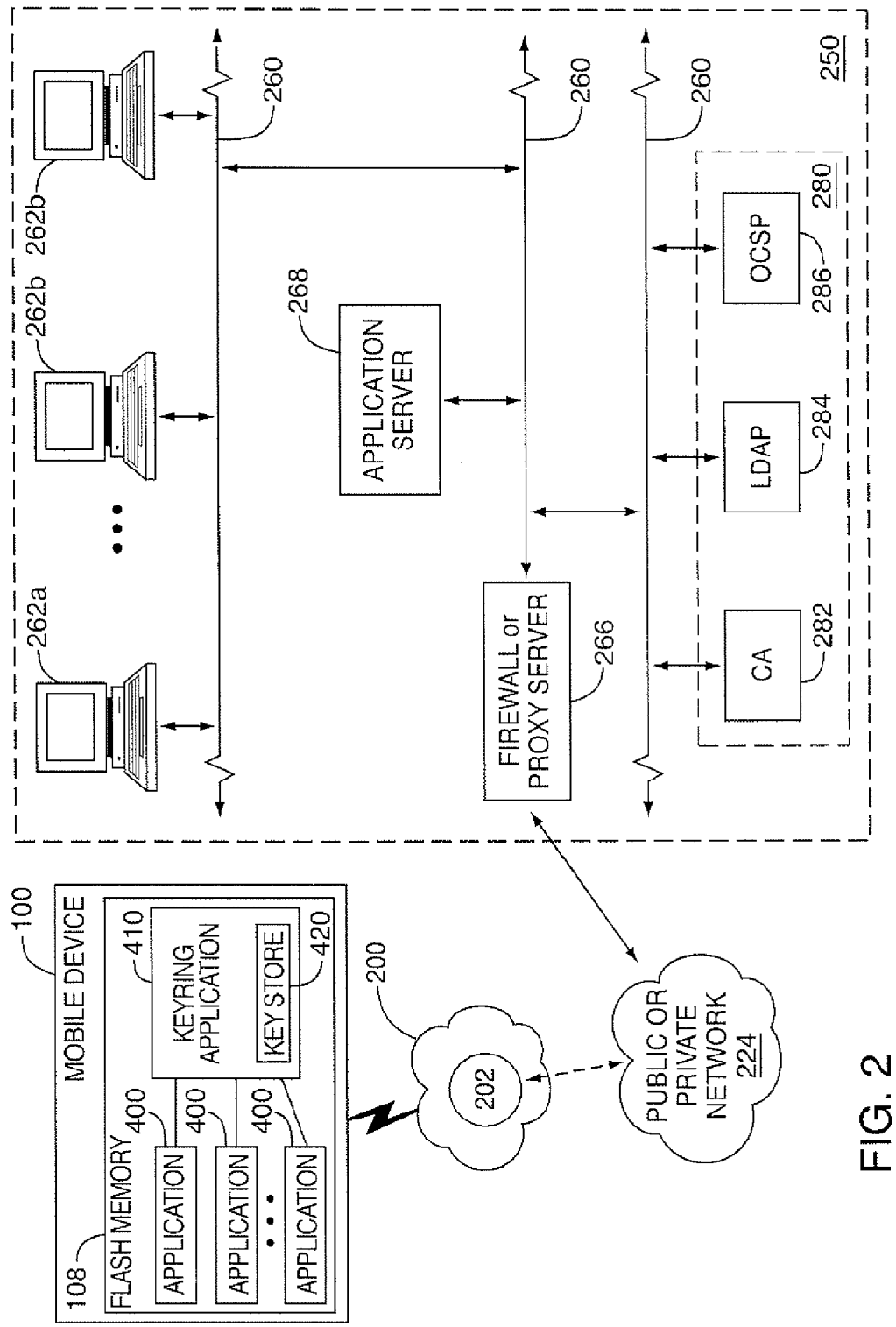
FIG. 2 is a block diagram illustrating components of a host system in one example configuration.

Referring now to FIG. 2, a block diagram illustrating components of a host system in one example configuration is shown. Host system 250 will typically be a corporate office or other local area network (LAN), but may instead be a home office computer or some other private system, for example, in variant implementations. In this example, host system 250 is depicted as a LAN of an organization to which a user of mobile device 100 belongs.

LAN 250 comprises a number of network components connected to each other by LAN connections 260. For instance, a user's desktop computer 262a for the user's mobile device 100 may be situated on LAN 250. Mobile device 100 may be coupled to computer 262a by a serial or a USB connection, for example. Other user computers 262b may also be situated on LAN 250. Information (e.g. PIM data, private symmetric encryption keys to facilitate secure communications between mobile device 100 and LAN 250) may be loaded from user computer 262a to mobile device 100, and this may include information loaded to mobile device 100 during an initialization of mobile device 100 for use. The information loaded to mobile device 100 may include certificates used in the exchange of messages. User computers 262a, 262b will typically be also connected to other peripheral devices not explicitly shown in FIG. 2.

Only a subset of network components of LAN 250 are shown in FIG. 2 for ease of exposition, and LAN 250 will typically comprise additional components not explicitly shown in FIG. 2. More generally, LAN 250 may represent a smaller part of a larger network [not shown] of the organization, and may comprise different components and/or be arranged in different topologies than that shown in the example of FIG. 2.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. Use of a wireless VPN router implies that a VPN connection can be established directly through a specific wireless network to mobile device 100. A wireless VPN router may be an off-the-shelf VPN component, not requiring a separate wireless gateway and separate wireless infrastructure to be used. A VPN connection may be a Transmission Control Protocol (TCP)/IP or User Datagram Protocol (UDP)/IP connection that delivers messages directly to mobile device 100.

Secure communication protocols rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a session key may be generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature generally comprises a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations may be validated using certificates. A certificate is a digital document typically issued by a certificate authority (CA). Certificates are used to authenticate the association between users and their public keys, and essentially, provides a level of trust in the authenticity of the users' public keys. Certificates may contain information about the certificate holder, with certificate contents typically formatted in accordance with an accepted standard (e.g. X.509).

For a public key to be trusted, its issuing organization must be trusted. The relationship between a trusted CA and a user's public key may be represented by a series of related certificates, also referred to as a certificate chain. The certificate chain can be followed to determine the validity of a certificate.

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 2, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100. However, in a variant implementation, LDAP server 284 may be accessed directly (i.e. "over the air" in this context) by mobile device 100, and mobile device 100 may search for and retrieve individual certificates through a mobile data server (not shown). Similarly, the mobile data server may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with a security policy governing the operation of the mobile device (e.g. an IT policy), for example.

Other sources of certificates [not shown] may include a Windows certificate store, another secure certificate store on or outside LAN 250, and smart cards, for example.

Applications 400 executable on a mobile device 100 may be stored on an application server 268. Application server 268 may be coupled or otherwise have access to an application database [not shown] that stores applications 400, for download to and execution on the mobile device 100. To have access to the applications 400 stored on the application server 268, each user may have a user account managed by the application server 268. Access to the application server 268 may be provided via a client application operating on mobile device 100, although in variant embodiments, access to the application server may be provided through a web browser, for example.

As illustrated, the application server 268 may be an internal network server of the host system 250 that is used to store applications 400 to be deployed to the organization's mobile devices 100. In a variant embodiment, the application server 268 may additionally or alternatively provide an application store or application market that is accessible from the mobile device 100. The application store may allow users of a mobile device 100 to search for, purchase, and download applications 400 to their mobile device 100. In some embodiments, the application server 268 may reside outside of the host system 250, on a remote system accessible via the public or private network 224, for example.

For ease of understanding the described embodiments, FIG. 2 further illustrates a simplified view of a subset of components of the mobile device 100 described above. The mobile device 100 may run software applications 400 (sometimes referred to simply as "apps") that access computing resources on the mobile device 100. As described earlier, applications 400 may provide access to a variety of services to the user of mobile device 100. The applications may be stored in the flash memory 108 of the mobile device 100 or other persistent store, and may access computing resources available on the mobile device 100 when executed. Access may be in the form of the applications invoking application programming interfaces (APIs) made available by the operating access to access the computing resources, for example.

A keyring application 410 (more generally referred to as a "keyring" herein) may also be provided on mobile device 100. Keyring 410 allows data to be stored in an associated secure data store (e.g. key store 420), and in this regard, the term "keyring" may also be used to refer generally to a structure in which the data is securely stored. The data stored in the keyring may reside, for example, on mobile device 100 in flash memory 108, on mobile device 100 in some other memory, on a device physically coupled to the mobile device 100, on a device remote from the mobile device 100, or distributed amongst some combination of these memories and devices.

As previously noted, keyring 410 may also be referred to as a keychain, a password store or password manager, a wallet, or more generally, a credential store or credential manager. Keyring 410 generally allows for the secure storage of data, particularly credentials that a user may wish to store securely (e.g. usernames, passwords, cryptographic (e.g. encryption) keys, access codes, digital certificates, and other secure data items), for multiple applications and services, typically by storing the data in encrypted form.

In some implementations, a user may need to enter a separate keyring password that has been specifically assigned to keyring 410 in order to unlock keyring 410 (i.e. to allow access to the data stored by keyring 410). In variant implementations, the user may not need to enter a keyring password.

While keyring 410 is locked, access to the contents of keyring 410 (and therefore of key store 420) is restricted; once the keyring is unlocked, however, one or more applications 400 may be permitted access to the contents of keyring 410 (i.e. to contents of key store 420 in the example).

In certain implementations, while keyring 410 is unlocked, a given application 400 may be permitted access only to contents of keyring 410 that it had directed keyring 410 to store; in other words, the given application 400 may access its own keyring items, but not data items stored in keyring 410 by any other application. In variant implementations, once keyring 410 is unlocked, any application may access any data items stored in keyring 410, even those created by and/or stored for other applications. In some implementations, a user must explicitly indicate that a given application 400 is trusted before it may be allowed access to the contents of keyring 410.

By way of illustration, consider the situation in which a device having a browser application has navigated to a website of an associated service, and is attempting to login to a user account for the service. The user may have previously set up a username and password for the account during a previous registration process, or the login being attempted may be performed as part of a registration process, for example. The browser application may offer to save login data such as usernames and passwords to a credential store. The credential store may be one that is used only by the browser application, or one that is shared by multiple applications on the computing device, as examples.

The attempt to save login data to the credential store provides an opportunity to warn the user when the login data is determined to present a potential security risk, and in turn, the notification may be sufficient to convince the user to reconsider his or her choice of login data for the corresponding user account.

Figure 3:
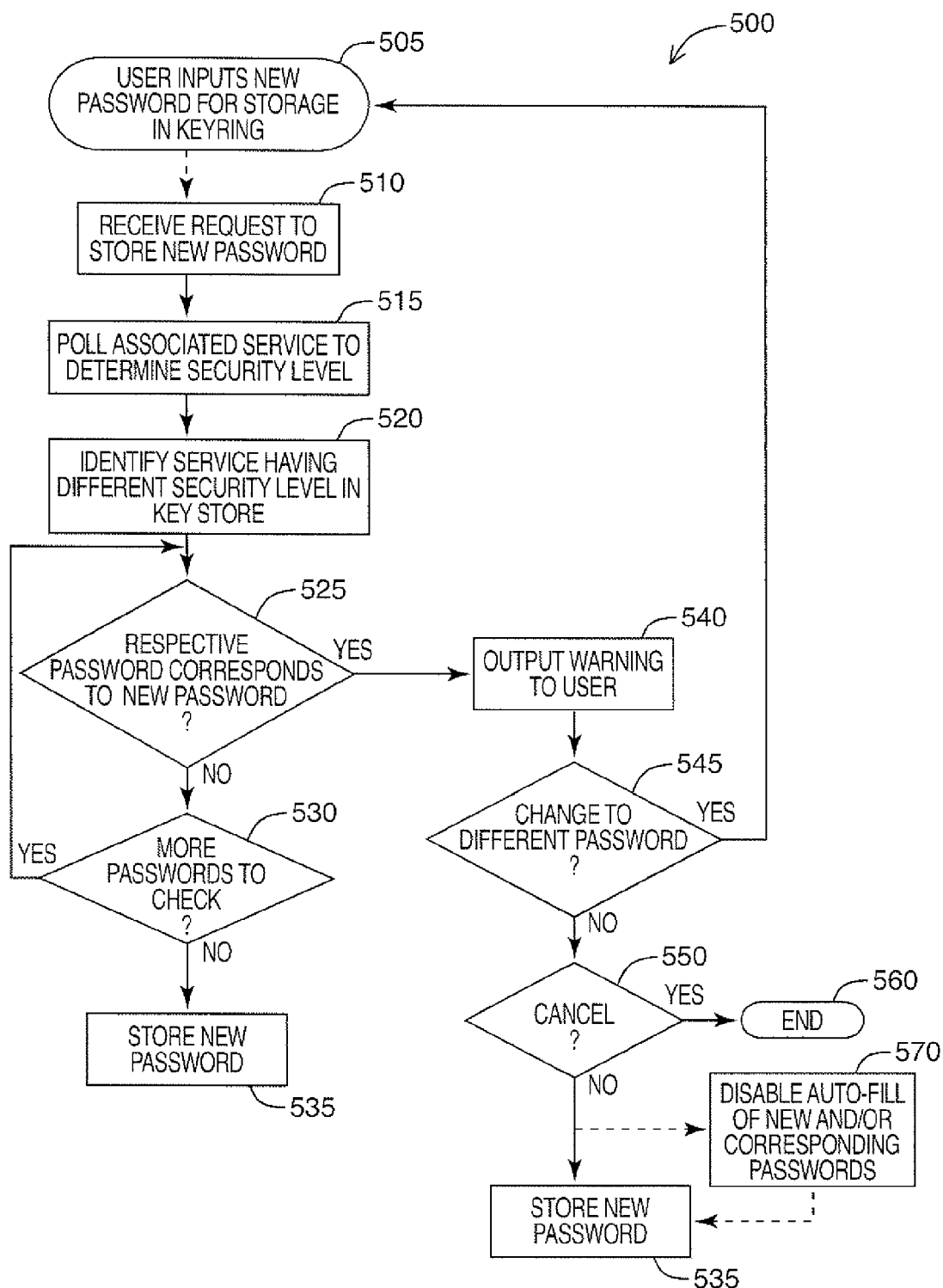
FIG. 3 is a flowchart diagram illustrating a method of providing a warning associated with a credential to be stored in a credential store, in accordance with at least one embodiment.

Referring now to FIG. 3, a flowchart diagram illustrating a method of providing a warning associated with a credential to be stored in a credential store in accordance with at least one embodiment is shown generally as 500. Acts of method 500 may be performed by a processor of a computing device, which may be a mobile device (e.g. by microprocessor 102 of mobile device 100 in FIG. 1). In one embodiment, an application for managing the credential store (e.g. keyring application 410 of FIG. 2) configures the processor to perform method 500.

For ease of exposition, the following example will be described with reference to a new password as the credential to be stored in the credential store. However, the embodiments described herein may be applied in analogous manner to other credentials in variant implementations, including for example, a new username to be stored in the credential store, or some combination of credentials to be stored in the credential store. As further examples, the credential to be stored in the credential store can include other identifiers or authentication factors, including authentication factors associated with near-field communication (NFC) authentication, graphical or passive approaches to authentication (e.g. location, keyboard input, accelerometer, etc.), and so on.

At 505, a new password to be stored in the credential store is received via user input at the computing device. For ease of exposition, the credential store is referred to generally herein as a keyring. The keyring may be managed by a keyring application specifically configured to store credentials for multiple other applications. Alternatively, the functionality of the keyring may be provided by a particular application for exclusive use by that application.

The user may input the new password to be stored in the keyring through a user interface provided by the keyring application, or via a user interface provided by a different application (e.g. during the use of a browser application when navigating to the login page of a website). Typically, the new password will be input along with a corresponding username and potentially other login data, and a request to store this information is transmitted to the keyring application. An identification of the service (e.g. website) that the new password is for will typically accompany the request.

In variant embodiments, the new password may also be received via import from another service, or injection via another service or application.

At 510, a request to store, in the key store of the keyring (e.g. key store 420 of FIG. 2), at least one credential for a specified service is received. For example, the new password (possibly with a username and/or other login data) for the specified service is received by the keyring application for processing.

At 515, the specified service is polled to determine an associated security level. This polling may be performed automatically (e.g. without user intervention) in response to receiving the request at 510. This act generally entails first determining whether a secure connection between the computing device and the specified service is available, and then associating the specified service with a level of security based on the availability of the secure connection and/or one or more properties of the secure connection.

For example, the user may wish to save a username and password for an online banking service. A network address of a website associated with the online banking service may be accessed by the keyring application, wherein the service is polled to determine whether a secure connection (e.g. SSL, TLS) is available.

In one embodiment, the specified service is associated with a "secure" level if the secure connection is available, and the specified service may then be referred to generally as a secure service; on the other hand, the specified service is associated with a "non-secure" level if the secure connection is unavailable, and the specified service may then be referred to generally as a non-secure service.

In a variant embodiment, if the secure connection is available, one or more properties of the secure connection may also be considered when associating the specified service with a level of security. Properties that may indicate a strength of the connection (e.g. availability of a 128-bit or a stronger connection), a key exchange algorithm type (e.g. some algorithms may be deemed "weak" and others as "strong" by an administrator or user), a bulk encryption algorithm (e.g. some algorithms may be deemed "weak" and others as "strong" by an administrator or user), a server authentication algorithm type (e.g. some algorithms may be deemed "weak" and others as "strong" by an administrator or user), and/or a message authentication code (MAC) algorithm type (e.g. some algorithms may be deemed "weak" and others as "strong" by an administrator or user) may be considered. For example, in one example implementation, a secure connection to the specified service of a minimum strength (e.g. defined by an administrator via a security policy) would need to be available in order for the specified service to be associated with a "secure level". By way of illustration, if a 128-bit (or stronger) connection is available for the specified service, the specified service may be deemed "secure", whereas if a weaker secure connection is available or if no secure connection is available for the specified service, the specified service may be deemed "non-secure".

In some embodiments, the act of associating a specified service with a level of security (e.g. "secure" or "non-secure") is performed in accordance with a security policy governing operation of the computing device (e.g. an IT policy). This may permit administrators to define and enforce minimum standards for determining whether a specified service is considered secure.

In variant embodiments, the act of associated a specified service with a level of security (e.g. "secure" or "non-secure") is performed in accordance with a policy that explicitly specifies the security level of services on a per-services basis.

Although the level of security has been described in the present example as "secure" or "non-secure" for ease of illustration, the level of security with which a specified service may be associated is not limited to "secure" or "non-secure". Other levels of security may be defined, and more than two levels may be defined in variant embodiments. For example, there may be multiple levels associated with a "secure" status. In some implementations, a level of security designated as "unknown" or the like may also be employed.

At 520, the data in the key store is analyzed to identify services having a different level of security from the level of security associated with the specified service determined at 515. In some embodiments, data in the key store will be stored as records in a data table or other data structure, with a username, password, an identifier of the associated service, and level of security stored for each record. By accessing the data in the 'level of security' field for each record, records associated with a different level of security from the level of security associated with the specified service can be identified.

For example, if a request to store a new password for an online banking service is received at 510 and the online banking service has been determined to be a secure service at 515, then services that are not identified as secure, for which data is stored in the key store, may be identified at 520.

As a further example, if a request to store a new password for an online news service (e.g. to post public comments to news articles) is received at 510 and the online news service has been determined to be a non-secure service at 515, then services that are identified as secure, for which data is stored in the key store, may be identified at 520.

Typically, the data in the key store is stored in encrypted form. Data may need to be decrypted (act not shown) before it is analyzed at 520. In some embodiments, the data may already be available in decrypted form (e.g. in a cache) for retrieval.

At 525, the password stored for each of the services identified at 520 as having a different level of security from the level of security associated with the specified service is compared to the new password. For each of the identified services, a determination is made as to whether the respective stored password corresponds to the new password for the specified service.

In one embodiment, the stored password corresponds to the new password if the stored password matches the new password. A stored password with minor variations compared to the new password (e.g. upper case versus lower case, common character substitutions, etc.) may be deemed to match the new password in certain implementations.

In a variant embodiment, the stored password corresponds to the new password if the store password is determined to be sufficiently similar to the new password (e.g. one password includes the entirety of the other password with the addition or deletion of one or more characters, certain characters of one password have been substituted for similar characters in the other password, certain sets of characters in one password have been transposed in the other password, etc.).

If a stored password is not determined to correspond to the new password, further stored passwords identified at 520 may be analyzed until they have all been checked (see e.g. 530). If no stored passwords identified at 520 are determined to correspond to the new password, then the new password may be stored in the key store at 535 (typically, the corresponding username, identifier of the associated service, and level of security are also stored with the new password).

If a stored password is determined to correspond to the new password, the flow of method 500 proceeds to 540, in which a warning is provided to a user, typically as output in a display of the computing device. The warning output at 540 comprises a notification that indicates, to the user, a potential risk of compromise to data associated with one or more secure services. In one embodiment, this notification may be provided as text in a dialog box. However, other forms of alerts, including other visual, vibrational, or auditory alerts may be provided in variant embodiments.

In accordance with at least one embodiment described herein, if the new password is for a service that is deemed to be secure, a warning will be provided if the new password corresponds to a stored password for a service that is deemed to be non-secure, to make the user aware of potential data compromise risks. As a further example, if the new password is for a service that is deemed to be non-secure, a warning will be provided if the new password corresponds to a stored password for a service that is deemed to be secure, to make the user aware of potential data compromise risks.

In some embodiments, all stored passwords identified at 520 may be analyzed before a warning is output to a display at 540. In other embodiments, once a stored password is determined to correspond to the new password, a warning is output to a display at 540, and further stored passwords may be checked if the user does not subsequently decide to cancel or change the request to store the new password (e.g. the "no" branch of 550, or act 570, may flow to 530—not shown).

In one embodiment, an option to prompt for a different password may be provided to the user, as shown at 545. If the user selects the option, the user may enter a different password (e.g. flow of method 500 proceeds to 505) and a further request to store the different password may be made.

In one embodiment, an option to cancel the request to store the new password may be provided to the user, as shown at 550. If the user elects to cancel the request, method 500 (at 560) ends and the new password is not stored.

In one embodiment, in response to the warning, the user may be prompted for confirmation to proceed with storing the new password for the specified service in the key store despite being warned of the risk of compromise to data associated with secure services. The new password may be stored (e.g. at 535) after the confirmation is received.

In a variant embodiment, an auto-fill function in a user interface of the computing device may be disabled when the new password and/or any stored password that was determined to correspond to the new password is expected to be received as user input in the user interface. If the new password is to be stored in the key store despite the warning, disabling the auto-fill function wherever the new password and/or any matching passwords are expected to be entered may provide some additional security. This forces the user to manually enter these passwords when logging into services, as the passwords have been deemed to be less secure given that there is a similar password stored for a different service (e.g. associated with a different security level) in the keyring. In these instances, the passwords may still be made available in a lookup function provided by the keyring for the user's reference, even though the auto-fill function has been disabled. The auto-fill function may prevent not only a password from being auto-filled for a particular site, but the auto-fill function may be disabled with respect to other accompanying fields as well, including username, personal information fields (e.g. name, address, telephone number, e-mail address), financial information fields (e.g. credit card numbers, account numbers, etc.), and so on.

With respect to the act of storing the new password at 535 in method 500, as previously noted, an indicator of the level of security with which the specified service is associated may be stored with the new password. Once the new password is stored, however, the level of security may change (e.g. the secure connection that had previously been determined to be available is no longer available for the specified service, a secure connection becomes available for the specified service where none was previously available, the strength of the secure connection has changed, the status of an SSL certificate associated with the specified service has changed, and/or the status of an SSL certificate associated with the specified service has been revoked, etc.).

Accordingly, in one embodiment, after the new password is stored in the key store, the method may further comprise periodically determining whether the level of security with which the specified service is associated has changed to a different level. This may be done at a certain interval (e.g. daily, weekly, monthly, etc.), which may be user-configurable or configurable by an administrator via a security policy (e.g. IT Policy), for example. In response, the indicator of the level of security may then be updated in the key store. The updated level of security can then be considered in subsequent iterations of an embodiment of the method in which requests to store new passwords are processed. In variant embodiments, existing passwords stored in the key store may also be re-checked, and a warning may be output to a display if the change in the level of security would result in an increased risk of compromise to data associated with one or more secure services. For example, whereas previously a secure connection was available for services A and B and the use of the same password was permitted for those services, and subsequently it is determined that a secure connection is no longer available for service A or the SSL certificate for service A has been revoked, the user may be warned and given the option to change the corresponding password for service A, service B, or both. This may be done prior to updating the level of security for service A in the key store, for example.

Figure 4:
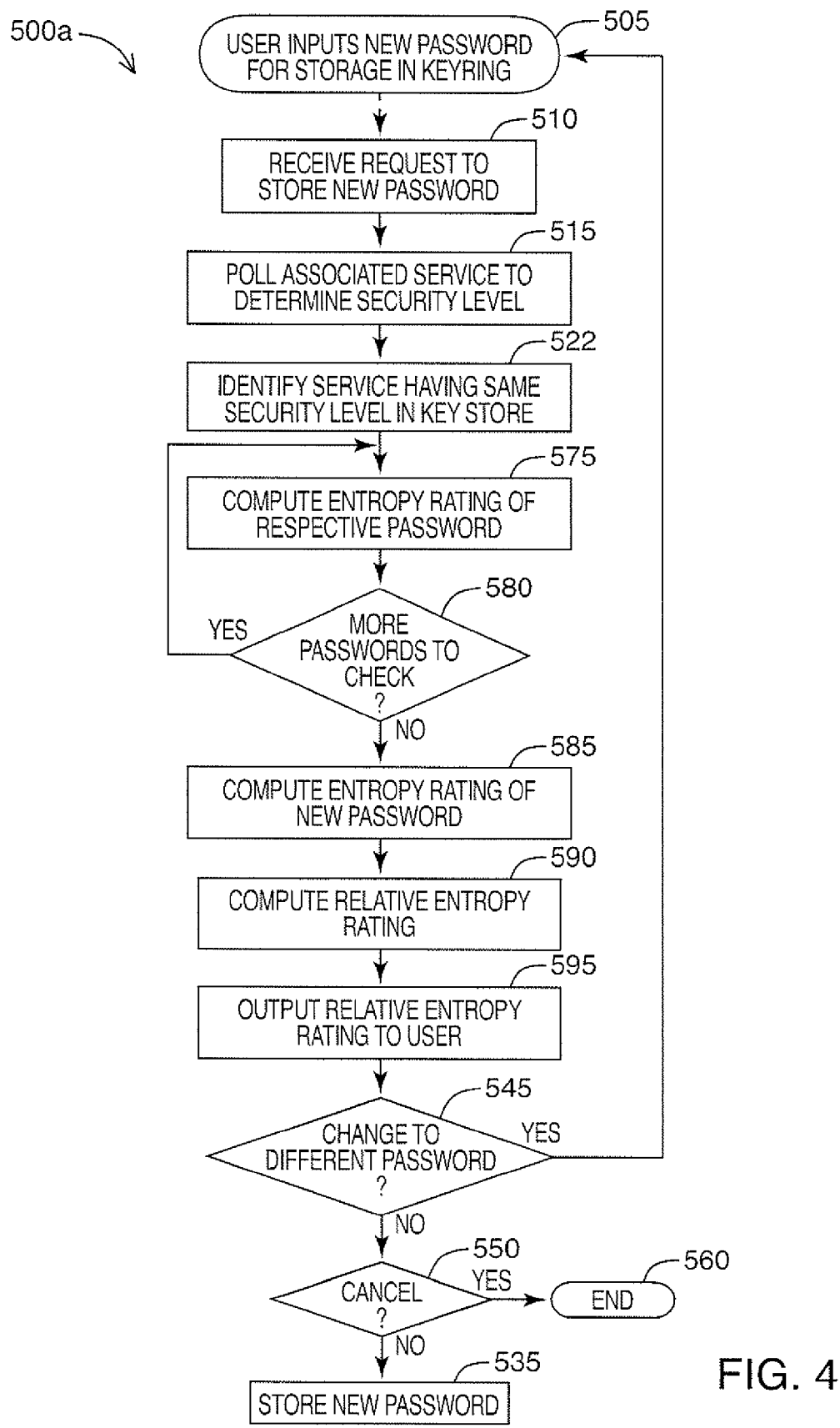
FIG. 4 is a flowchart diagram illustrating a method of providing a warning associated with a credential to be stored in a credential store, in accordance with at least one other embodiment.

Referring now to FIG. 4, a flowchart diagram illustrating a method of providing a warning associated with a credential to be stored in a credential store in accordance with at least one other embodiment is shown generally as 500a. Acts of method 500a may be performed by a processor of a computing device, which may be a mobile device (e.g. by microprocessor 102 of mobile device 100 in FIG. 1). In one embodiment, an application for managing the credential store (e.g. keyring application 410 of FIG. 2) configures the processor to perform method 500a.

For ease of exposition, the following example will be described with reference to a new password as the credential to be stored in the credential store. However, the embodiments described herein may be applied in analogous manner to other credentials in variant implementations, including for example, a new username to be stored in the credential store, or some combination of credentials to be stored in the credential store. As further examples, the credential to be stored in the credential store can include other identifiers or authentication factors, including authentication factors associated with near-field communication (NFC) authentication, graphical or passive approaches to authentication (e.g. location, keyboard input, accelerometer, etc.), and so on.

At 505, a new password to be stored in the credential store is received via user input. For ease of exposition, the credential store is referred to generally herein as a keyring. The keyring may be managed by a keyring application specifically configured to store credentials for multiple other applications. Alternatively, the functionality of the keyring may be provided by a particular application for exclusive use by that application.

The user may input the new password to be stored in the keyring through a user interface provided by the keyring application, or via a user interface provided by a different application (e.g. during the use of a browser application when navigating to the login page of a website). Typically, the new password will be input along with a corresponding username, and potentially other login data, and a request to store this information is transmitted to the keyring application. An identification of the service (e.g. website) that the new password is for will typically accompany the request.

In variant embodiments, the new password may also be received via import from another service, or injection via another service or application.

At 510, a request to store, in a key store of the keyring (e.g. key store 420 of FIG. 2), at least one credential for a specified service is received. For example, the new password (possibly with a username and/or other login data) for the specified service is received by the keyring application for processing.

At 515, the specified service is polled to determine an associated security level. This polling may be performed automatically (e.g. without user intervention) in response to receiving the request at 510. This act generally entails first determining whether a secure connection between the computing device and the specified service is available, and then associating the specified service with a level of security based on the availability of the secure connection and/or one or more properties of the secure connection.

For example, the user may wish to save a username and password for an online banking service. A network address of a website associated with the online banking service may be accessed by the keyring application, wherein the service is polled to determine whether a secure connection (e.g. SSL, TLS) is available.

In one embodiment, the specified service is associated with a "secure" level if the secure connection is available, and the specified service may then be referred to generally as a secure service; on the other hand, the specified service is associated with a "non-secure" level if the secure connection is unavailable, and the specified service may then be referred to generally as a non-secure service.

In a variant embodiment, if the secure connection is available, one or more properties of the secure connection may also be considered when associating the specified service with a level of security. Properties that may indicate a strength of the connection (e.g. availability of a 128-bit or a stronger connection), a key exchange algorithm type (e.g. some algorithms may be deemed "weak" and others as "strong" by an administrator or user), a bulk encryption algorithm (e.g. some algorithms may be deemed "weak" and others as "strong" by an administrator or user), a server authentication algorithm type (e.g. some algorithms may be deemed "weak" and others as "strong" by an administrator or user), and/or a message authentication code (MAC) algorithm type (e.g. some algorithms may be deemed "weak" and others as "strong" by an administrator or user) may be considered. For example, in one example implementation, a secure connection to the specified service of a minimum strength (e.g. defined by an administrator via a security policy) would need to be available in order for the specified service to be associated with a "secure level". By way of illustration, if a 128-bit (or stronger) connection is available for the specified service, the specified service may be deemed "secure", whereas if a weaker secure connection is available or if no secure connection is available for the specified service, the specified service may be deemed "non-secure".

In some embodiments, the act of associating a specified service with a level of security (e.g. "secure" or "non-secure") is performed in accordance with a security policy governing operation of the computing device (e.g. an IT policy). This may permit administrators to define and enforce minimum standards for determining whether a specified service is considered secure.

In variant embodiments, the act of associated a specified service with a level of security (e.g. "secure" or "non-secure") is performed in accordance with a policy that explicitly specifies the security level of services on a per-services basis.

Although the level of security has been described in the present example as "secure" or "non-secure" for ease of illustration. Other levels of security may be defined, and more than two levels may be defined in variant embodiments. For example, there may be multiple levels associated with a "secure" status. In some implementations, a level of security designated as "unknown" or the like may also be employed.

At 522, the data in the key store is analyzed to identify services having the same level of security as the level of security associated with the specified service as determined at 515. In some embodiments, data in the key store will be stored as records in a data table or other data structure, with a username, password, an identifier of the associated service, and level of security stored for each record. By accessing the data in the 'level of security' field for each record, records associated with the same level of security as the level of security associated with the specified service can be identified.

For example, if a request to store a new password for an online banking service is received at 510 and the online banking service has been determined to be a secure service at 515, then other services that are also identified as secure, for which data is stored in the key store, may be identified at 522.

As a further example, if a request to store a new password for an online news service (e.g. to post public comments to news articles) is received at 510 and the online news service has been determined to be a non-secure service at 515, then other services that are also identified as non-secure, for which data is stored in the key store, may be identified at 522.

Typically, the data in the key store is stored in encrypted form. Data may need to be decrypted (act not shown) before it is analyzed at 522. In some embodiments, the data may already be available in decrypted form (e.g. in a cache) for retrieval.

At 575, for each password identified at 522 as having the same level of security as the level of security associated with the specified service, an entropy rating is determined. The entropy rating generally comprises a measure of the level of complexity of the password. Typically, the greater the entropy rating, the more complex the password is, and thus, the safer the password is from being guessed by an attacker. The entropy rating may be determined based on any of a number of factors associated with the given password, including for example, and without limitation: the number of characters in the password, the number of different character types used in the password (e.g. upper case alphabetic characters, lower case alphabetic characters, numeric characters, punctuation and other characters, etc.), whether the password is a derivative of a corresponding username, whether the password can be derived from a dictionary entry, etc. Other algorithms for determining the entropy of a password may be employed.

Method 500a continues until an entropy rating for all passwords identified at 522 as having the same level of security as the level of security associated with the specified service have been determined (see e.g. 580).

At 585, an entropy rating for the new password for which the request at 510 is received is determined. This act may be performed before, after, or in parallel with the determinations of entropy ratings at 575, depending upon implementation.

At 590, a relative entropy rating is determined for the new password. The relative entropy rating generally comprises a function of the entropy ratings previously computed at 575 and 585. The relative entropy rating determined at 590 reflects the level of complexity of the new password in relation to the level of complexity of all passwords stored in the key store for services having the same level of security as the level of security associated with the specified service.

In one embodiment, determining the relative entropy rating may comprise ordering all of the entropy ratings determined at 575, and computing a rank index indicating where the entropy rating for the new password ranks in the determined order. The relative entropy rating may be based on this rank index. For example, if the entropy rating for the new password indicates that the new password is the ninth most complex password out of 10 passwords stored in the key store, the relative entropy rating "9" may be displayed as a numerical value, or represented graphically on a scale from 1 to 10 (e.g. where the passwords of highest complexity are represented by 10 on the scale) for example. In another implementation, the relative entropy rating may represent an actual ranking, indicating that the new password is "ranked #2 out of 10 passwords" in terms of complexity, for example. A descriptor (e.g. very weak, weak, average, strong, very strong, etc.) of the complexity of the new password relative to other passwords for services of the same level of security may be provided in certain implementations. The relative entropy rating may be represented by a point or item on other scales in variant implementations (e.g. a scale of colors, from dark red to dark green). Other methods of determining the relative entropy rating to be output may be employed.

At 595, the relative entropy rating determined at 590 is output to a display, in a user interface of the computing device. The relative entropy rating may be in the form of at least one of a graphical icon, a numerical value, or a text description, as examples. Other forms of alerts, including other visual, vibrational, or auditory alerts may accompany the output of the relative entropy rating.

In this embodiment, the relative entropy rating provides a potential warning to the user that the new password may be insufficiently complex relative to services having the same level of security, and may allow the user to reconsider his choice for the new password.

For example, from the relative entropy rating, a user may be apprised of the fact that the new password is the most complex, the least complex, or has a level of complexity somewhere in between, with respect to other passwords being used for services of a comparable level of security. Even if each of the passwords being used for services of a given level of security are not very complex in general, or are all highly complex generally, the relative entropy rating may nevertheless provide a hint as to how secure the new password is in relation to other passwords. For instance, even if a new password would be objectively considered to be highly complex, but the relative entropy rating indicates that the new password is the least complex of all passwords being used for secure services, the user may be inclined to reconsider his choice of password.

In variant embodiments, an overall relative entropy rating that determines the complexity of a new password relative not only to other passwords stored in the key store for services having the same level of security as the level of security associated with the specified service, but also to other passwords for services having a different level of security (e.g. passwords for both secure and non-secure services may be considered) may be output in addition to, or alternatively, to the relative entropy rating output at 595.

In variant embodiments, an explicit warning may be output on the display if a relative entropy rating represent a complexity lower than a certain threshold. The threshold may be defined by, for example, a user or by an administrator (e.g. in accordance with IT policy).

In variant embodiments, if in the course of determining entropy ratings (see 575, 580, 585), it is determined that at least one stored password matches (or is similar to) the new password, and the relative entropy rating for the new password represents a complexity lower than a certain threshold, an auto-fill function in a user interface of the computing device may be disabled when the new password and/or any stored password that was determined to correspond to (e.g. matches, or is similar to) the new password is expected to be received as user input in the user interface. Disabling the auto-fill function may provide some additional security. This forces the user to manually enter these passwords when logging into services, as the passwords have been deemed to be less secure given the low relative entropy rating. The auto-fill function may prevent not only a password from being auto-filled for a particular site, but the auto-fill function may be disabled with respect to other accompanying fields as well, including username, personal information fields (e.g. name, address, telephone number, e-mail address), financial information fields (e.g. credit card numbers, account numbers, etc.), and so on.

In one embodiment, after the relative entropy rating has been output at 595, an option to prompt for a different password may be provided to the user, as shown at 545. If the user selects the option, the user may enter a different password (e.g. flow of method 500*a* proceeds to 505) and a further request to store the different password may be made.

In one embodiment, an option to cancel the request to store the new password may be provided to the user, as shown at 550. If the user elects to cancel the request, method 500*a* (at 560) ends and the new password is not stored.

At 535, the new password is stored in the key store if the request is not cancelled by the user. In one embodiment, the user may be prompted for confirmation to proceed with storing the new password for the specified service in the key store. The new password may be stored (e.g. at 535) after the confirmation is received.

With respect to the act of storing the new password at 535 in method 500*a*, as previously noted, an indicator of the level of security with which the specified service is associated may be stored with the new password. Once the new password is stored, however, the level of security may change (e.g. the secure connection that had previously been determined to be available is no longer available for the specified service, a secure connection becomes available for the specified service where none was previously available, the strength of the secure connection may change, the status of an SSL certificate associated with the specified service has changed, and/or the status of an SSL certificate associated with the specified service has been revoked, etc.).

Accordingly, in one embodiment, after the new password is stored in the key store, the method may further comprise periodically determining whether the level of security with which the specified service is associated has changed to a different level. This may be done at a certain interval (e.g. daily, weekly, monthly, etc.), which may be user-configurable or configurable by an administrator via a security policy (e.g. IT Policy), for example. In response, the indicator of the level of security may then be updated in the key store. The updated level of security can then be considered in subsequent iterations of an embodiment of the method in which requests to store new passwords are processed.

In accordance with at least one embodiment described herein, with reference to method 500 of FIG. 3 and the accompanying description, a warning of potential compromise to data associated with secure services may be output to a display when a new password to be stored in the key store corresponds to (e.g. matches) a password already stored in the key store for a service having a different level of security. In accordance with at least one other embodiment described herein, with reference to method 500*a* of FIG. 4 and the accompanying description, a warning may be output to a display in the form of a relative entropy rating, which may inform the user when the new password is, for example, less complex relative to other passwords already stored in the key store for a service having the same level of security.

Figure 5:
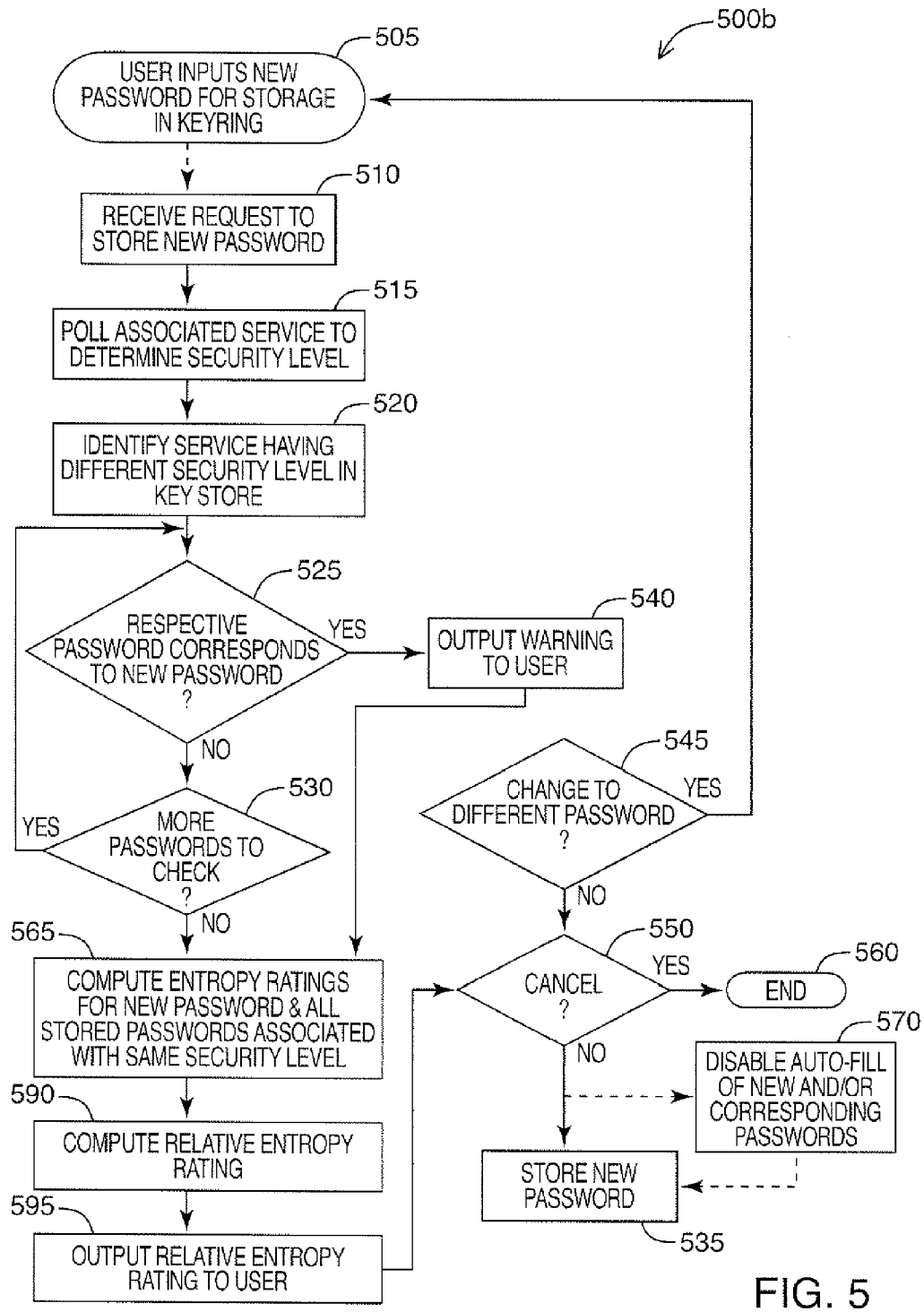
FIG. 5 is a flowchart diagram illustrating a method of providing a warning associated with a credential to be stored in a credential store, in accordance with at least one other embodiment.

In variant embodiments, various features described with reference to methods 500 and 500*a* may be implemented in combination, as shown in FIG. 5 generally as 500*b*, by way of example. A first set of acts associated with determining whether the new password corresponds to a stored password for a service having a different level of security may be performed (see e.g. 520 to 540) as well as a second set of acts associated with determining and outputting a relative entropy rating for the new password (see e.g. 565 to 595, where 565 generally corresponds to acts 522, 575, 580 and 585 of FIG. 4) may be performed. At least some of the acts of method 500*b* correspond to acts previously described with reference to FIGS. 3 and 4, and the reader is directed to earlier parts of the specification for a detailed description of those acts. While the first and second sets of acts are illustrated as being performed in a particular order in FIG. 5, the first and second sets of acts may be performed in an alternative order with respect to each other, or in parallel, for example, in variant implementations.

Figure 6A:
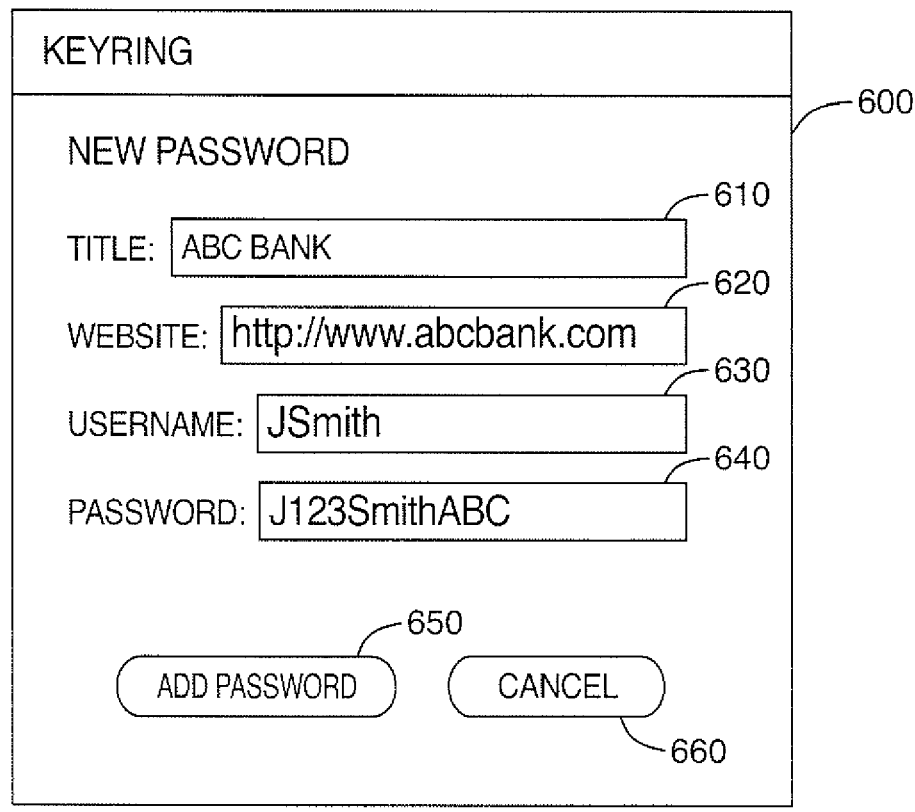
FIGS. 6A and 6B illustrate example visual output in a user interface provided by a keyring application in one example implementation.
Figure 6B:
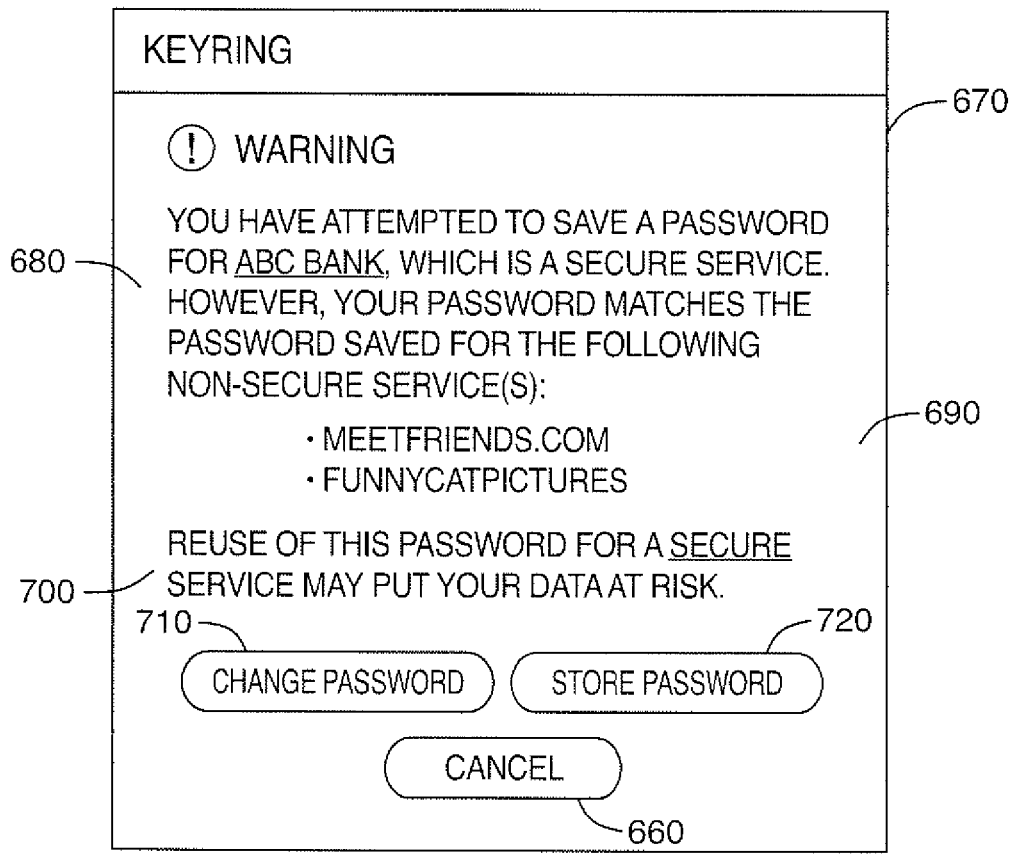

Referring to FIGS. 6A and 6B, example visual outputs that may be displayed on a user interface provided by a keyring application of a computing device are shown. By way of illustration, FIG. 6A shows a visual output comprising dialog 600 in which data associated with a request to store a new password in a keyring is entered. The data for the request may be entered into fields that include a title 610 for the associated site or service, the address 620 for the associated site or service, the proposed login username 630, and the proposed new password 640. Controls associated with an option 650 to submit the request and an option 660 to cancel the request are also provided in dialog 600.

After performing acts of an embodiment of method 500, for example, a visual output comprising a warning dialog 670 is output to a display as shown in FIG. 6B. An explanation 680 is provided, that indicates that the new password is for a secure service, and that that new password matches (or is similar to) the password for at least one non-secure service, as identified at 690. A notification 700 is provided that indicates that use of the new password may put data for a secure service at risk.

In this example, controls associated with a number of user-selectable options are displayed, including an option 710 to change the new password to a different password, an option 720 to store the new password despite the risks of which the user has been notified, and an option 660 to cancel the request.

Figure 7A:
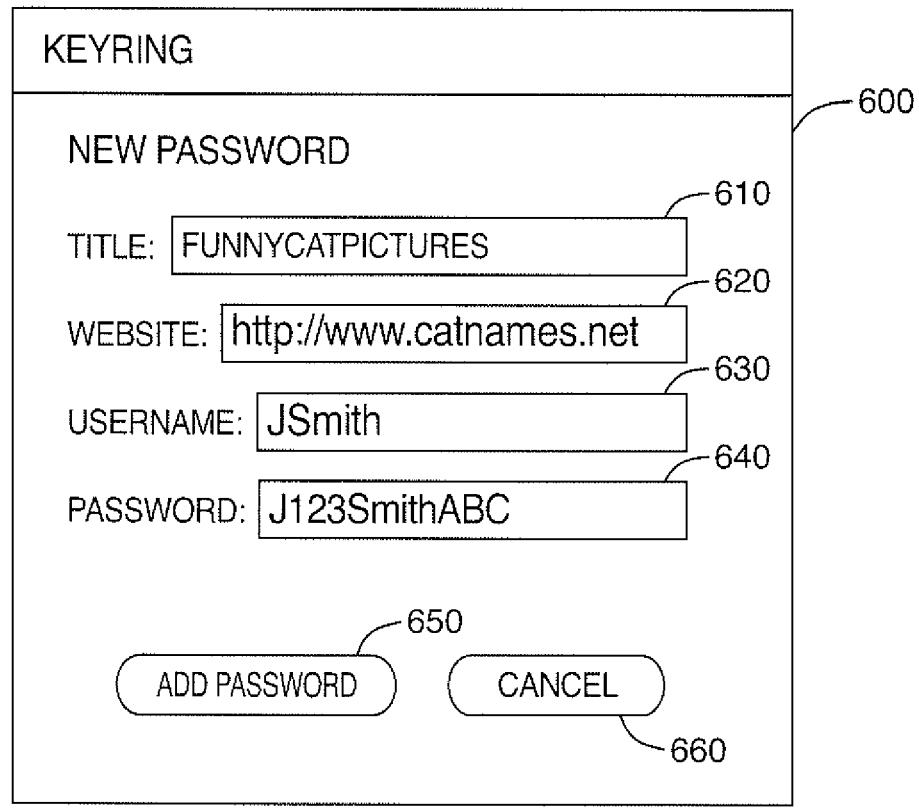
FIGS. 7A and 7B illustrate example visual output in a user interface provided by a keyring application in another example implementation.
Figure 7B:
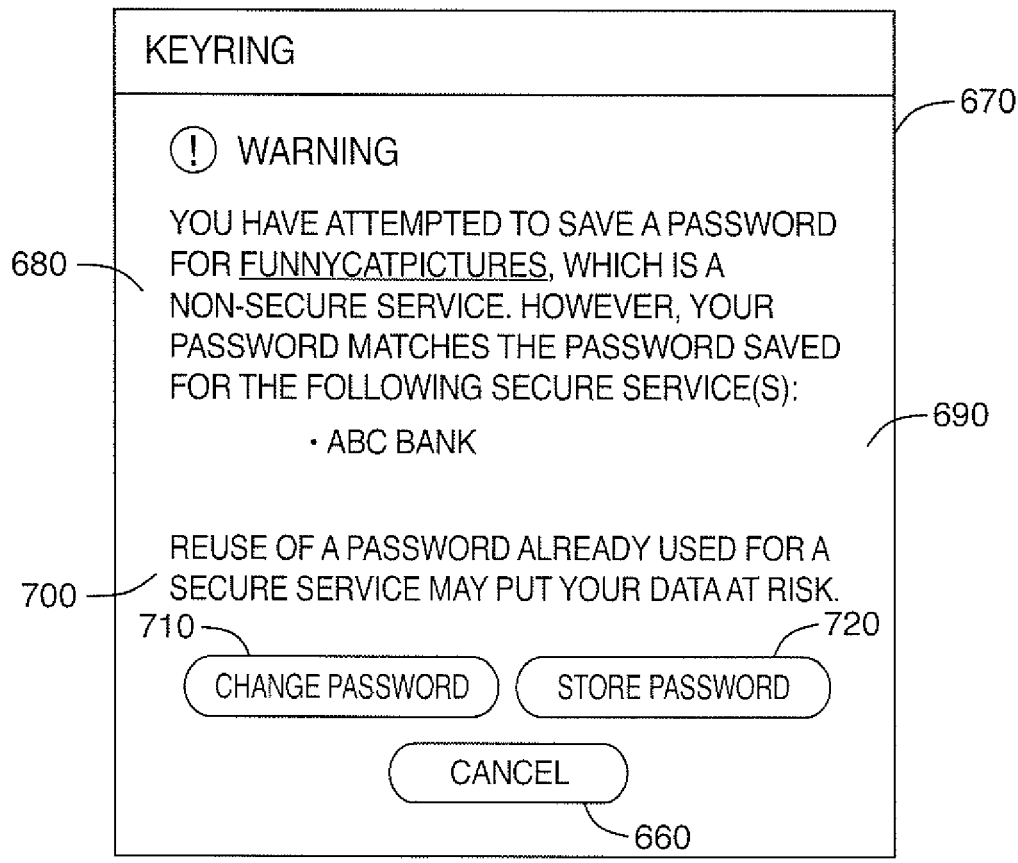

Referring to FIGS. 7A and 7B, example visual outputs that may be displayed on a user interface provided by a keyring application of a computing device are shown. By way of illustration, FIG. 7A shows a visual output comprising dialog 600 in which data associated with a request to store a new password in a keyring is entered, similar to the dialog shown in FIG. 6A. Similarly, after performing acts of an embodiment of method 500, for example, a visual output comprising warning dialog 670 is output to a display as shown in FIG. 7B, similar to the warning dialog shown in FIG. GB. In this example, the explanation 680 provided indicates that the new password is for a non-secure service, and that that new password matches (or is similar to) the password for at least one secure service, as identified at 690. A notification 700 is provided that indicates that use of the new password may put data for a secure service at risk.

As in the example of FIG. 6B, controls associated with a number of user-selectable options may be displayed in the warning dialog 670 of FIG. 7B, including an option 710 to change the new password to a different password, an option 720 to store the new password despite the risks of which the user has been notified, and an option 660 to cancel the request.

Figure 8:
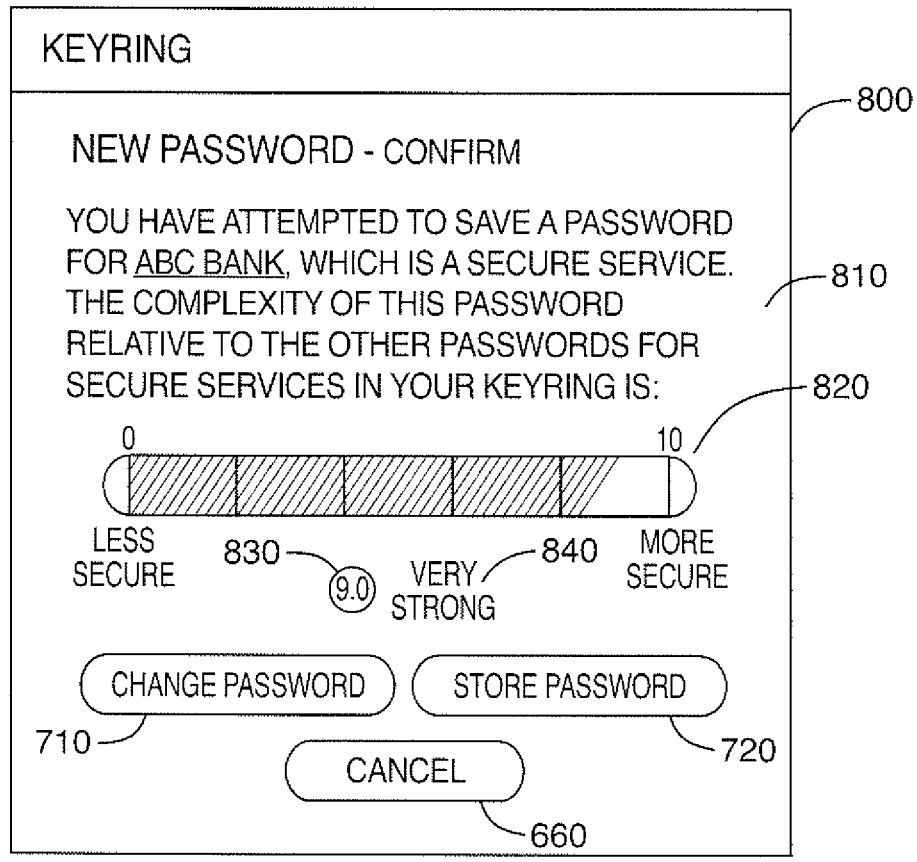
FIG. 8 is an example visual output in a user interface provided by a keyring application in another example implementation.

Referring to FIG. 8, an example visual output that may be displayed on a user interface provided by a keyring application of a computing device in accordance with at least one other embodiment is shown. By way of illustration, FIG. 8 shows a visual output comprising warning dialog 800 in response to a request to store a new password in a keyring. After performing acts of an embodiment of method 500a, for example, the warning dialog 800 provides an explanation 810 that may indicate that a relative entropy rating for the new password has been determined. The relative entropy rating is illustrated using a graphic 820, a numerical value 830, and a text descriptor 840 in this example. Some or all of the features described in FIG. 8 may be integrated into other user interfaces, including for example, the user interfaces depicted in the example visual outputs of FIGS. 6B and 7B.

After considering the information provided by the relative entropy rating displayed in dialog 800, the user may then select an option via controls displayed on the user interface. The user-selectable options may include an option 710 to change the new password to a different password, an option 720 to store the new password despite the risks of which the user has been notified, and an option 660 to cancel the request.

Although embodiments described herein have been primarily described with reference to passwords as credentials for ease of exposition, other types of credentials may also be monitored. For example, commonality of usernames between services having a different level of security may be assessed. If the user has used the same username across multiple services with different levels of security, the user may be warned of risks of potential data compromise to secure services, particularly given that the username typically represents one-half of the data (in addition to a password) used when authenticating a user to a service.

In variant embodiments, multiple new passwords may be received via user input for storage (e.g. at 510 of FIGS. 3 to 5). For example, three different passwords, preferably of varying complexity may be provided (e.g. low, medium, high) for an associated service. In response to determining a security level for the associated service, a suggestion of which of the three different passwords (e.g. low, medium, or high) would be most appropriate for use and storage, given the security level for the associated service may be output on the display of the computing device. More generally, the receiving of N passwords may be similarly accommodated.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, other variations and modifications may be made without departing from the scope of the embodiments defined in the claims appended hereto.

The invention claimed is:

1. A method of providing a warning associated with credentials to be stored in a credential store on a computing device, the method comprising:
   receiving a request to store, in the credential store, at least one credential for a specified service;
   determining whether a secure connection between the computing device and the specified service is available;
   associating the specified service with a level of security based on at least one of an availability of the secure connection or one or more properties of the secure connection, the specified service being associated with a secure level if the secure connection is available and is of a minimum encryption strength, and with a non-secure level otherwise;
   determining (i) that at least one credential stored in the credential store is for a service that is associated with a different level of security from the level of security with which the specified service is associated, and (ii) that at least one of the at least one credential for the service associated with the different level of security corresponds to the at least one credential for the specified service; and
   providing a warning in response to the determining.

2. The method of claim 1, wherein the providing comprises outputting a notification that indicates a risk of compromise to data associated with one or more secure services.

3. The method of claim 1, further comprising:
   responsive to providing the warning, prompting for user input as to whether to proceed with storing the at least one credential for the specified service in the credential store; and
   storing the at least one credential for the specified service in the credential store in response to receiving the user input to proceed with storing.

4. The method of claim 1, further comprising storing, in association with the at least one credential in the credential store, an indicator of the level of security with which the specified service is associated.

5. The method of claim 4, further comprising:
   periodically determining whether the level of security with which the specified service is associated has changed to a different level; and
   updating the indicator in response to determining that the level of security with which the specified service is associated has changed to the different level.

6. The method of claim 3, further comprising:
   in response to the storing, disabling an auto-fill function in a user interface of the computing device when the at least one credential for the specified service is expected to be received as user input in the user interface.

7. The method of claim 3, further comprising:
   in response to the storing, disabling an auto-fill function in a user interface of the computing device when any credential that is stored in the credential store and that corresponds to the at least one credential for the specified service is expected to be received as user input in the user interface.

8. The method of claim 1, further comprising:
   in response to providing the warning, providing an option to cancel the request.

9. The method of claim 1, further comprising:
   in response to providing the warning, providing an option to prompt for at least one different credential, for the specified service, to request to store in the credential store.

10. The method of claim 1, further comprising polling the specified service to determine whether the secure connection between the computing device and the specified service is available.

11. The method of claim 10, wherein the polling is performed without user intervention, in response to receiving the request.

12. The method of claim 1, wherein the secure connection comprises at least one of a Transport Layer Security (TLS) connection or a Secure Sockets Layer (SSL) connection.

13. The method of claim 1, wherein the one or more properties of the secure connection comprises at least one of: a strength of the secure connection, a key exchange algorithm type, a bulk encryption algorithm type, a server authentication algorithm type, or a message authentication code (MAC) algorithm type.

14. The method of claim 1, wherein the associating the specified service with the level of security is performed in accordance with a security policy governing operation of the computing device.

15. The method of claim 1, wherein the at least one credential stored in the credential store corresponds to the at least one credential associated with the specified service if the at least one credential stored in the credential store matches the at least one credential associated with the specified service.

16. The method of claim 1, wherein the at least one credential stored in the credential store corresponds to the at least one credential associated with the specified service if the at least one credential stored in the credential store is determined to be sufficiently similar to the at least one credential associated with the specified service.

17. The method of claim 1, further comprising:
determining a first entropy rating for the at least one credential for the specified service;
for each credential stored in the credential store that is for a service associated with a same level of security as the level of security with which the specified service is associated, determining a second entropy rating for the credential;
determining a relative entropy rating for the at least one credential for the specified service, the relative entropy rating comprising a function of the first and second entropy ratings; and
outputting the relative entropy rating.

18. The method of claim 17, wherein the relative entropy rating is output in the form of at least one of a graphical icon, a numerical value, or a text descriptor.

19. The method of claim 17, further comprising:
responsive to outputting the relative entropy rating, prompting for user input as to whether to proceed with storing the at least one credential for the specified service in the credential store; and
storing the at least one credential for the specified service in the credential store in response to receiving the user input to proceed with storing.

20. The method of claim 17, further comprising:
in response to outputting the relative entropy rating, providing an option to cancel the request.

21. The method of claim 17, further comprising:
in response to outputting the relative entropy rating, providing an option to prompt for at least one different credential, for the specified service, to request to store in the credential store.

22. The method of claim 1, wherein the at least one credential for the specified service comprises a password.

23. The method of claim 1, wherein the at least one credential for the specified service comprises a username.

24. A computing device programmed to provide a warning associated with credentials to be stored in a credential store, the computing device comprising a processor configured to:
receive a request to store, in the credential store, at least one credential for a specified service;
determine whether a secure connection between the computing device and the specified service is available;
associate the specified service with a level of security based on at least one of an availability of the secure connection or one or more properties of the secure connection, the specified service being associated with a secure level if the secure connection is available and is of a minimum encryption strength, and with a non-secure level otherwise;
determine (i) that at least one credential stored in the credential store is for a service that is associated with a different level of security from the level of security with which the specified service is associated and (ii) that at least one of the at least one credential for the service associated with the different level of security corresponds to the at least one credential for the specified service; and
provide a warning in response to the determining.

25. A non-transitory computer-readable storage medium comprising executable instructions for programming a computing device to provide a warning prior to storing credentials in a credential store on the computing device, the instructions configuring a processor of the computing device to:
receive a request to store, in the credential store, at least one credential for a specified service;
determine whether a secure connection between the computing device and the specified service is available;
associate the specified service with a level of security based on at least one of an availability of the secure connection or one or more properties of the secure connection, the specified service being associated with a secure level if the secure connection is available and is of a minimum encryption strength, and with a non-secure level otherwise;
determine (i) that at least one credential stored in the credential store is for a service that is associated with a different level of security from the level of security with which the specified service is associated, and (ii) that at least one of the at least one credential for the service associated with the different level of security corresponds to the at least one credential for the specified service; and
provide a warning in response to the determining.

* * * * *